US010833731B1

(12) United States Patent
Maity et al.

(10) Patent No.: US 10,833,731 B1
(45) Date of Patent: Nov. 10, 2020

(54) MANAGING RESOURCE OR SERVICE UTILIZATION WITHIN A LOCATION

(71) Applicant: International Business Machines Corporation, Armonk, NY (US)

(72) Inventors: Partha Sarathi Maity, Midnapur (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/445,857

(22) Filed: Jun. 19, 2019

(51) Int. Cl.
*H04B 5/00* (2006.01)
*H04W 4/021* (2018.01)
*H04W 4/80* (2018.01)

(52) U.S. Cl.
CPC .......... *H04B 5/0031* (2013.01); *H04W 4/021* (2013.01); *H04W 4/80* (2018.02)

(58) Field of Classification Search
CPC ...... H04B 5/0031; H04W 4/80; H04W 4/021; B66B 1/3461; B66B 1/3438; B66B 1/3407; B66B 1/3446
USPC ............................................... 455/41.1–41.3
See application file for complete search history.

(56) References Cited

U.S. PATENT DOCUMENTS

| 10,148,513 B1 | 12/2018 | Narayanam | |
| 2009/0133969 A1* | 5/2009 | Zaharia | B66B 1/462 |
| | | | 187/388 |
| 2014/0257905 A1* | 9/2014 | Zimmermann | G06Q 10/1095 |
| | | | 705/7.19 |
| 2017/0349402 A1* | 12/2017 | Chapman | H04W 4/023 |
| 2018/0331911 A1 | 11/2018 | Narayanam | |
| 2018/0346282 A1* | 12/2018 | Simcik | B66B 1/3461 |
| 2018/0370760 A1 | 12/2018 | Huang | |
| 2019/0002237 A1 | 1/2019 | Scoville | |
| 2019/0020971 A1* | 1/2019 | Ginsberg | H04L 67/34 |
| 2019/0161318 A1* | 5/2019 | Wedzikowski | B66B 1/468 |
| 2019/0297455 A1* | 9/2019 | Lerner | H04W 4/023 |

FOREIGN PATENT DOCUMENTS

| WO | 2017112659 A1 | 6/2017 |
| WO | 2017175019 A1 | 10/2017 |

* cited by examiner

*Primary Examiner* — Yuwen Pan
*Assistant Examiner* — Angelica M Perez
(74) *Attorney, Agent, or Firm* — Daniel R. Simek

(57) ABSTRACT

Aspects of the present disclosure include a method, computer program product, and system for managing access to a resource or service based on a location of a device. The method includes one or more processors detecting a request from a computing device for a service. The method further includes one or more processors establishing a request from a computing device for a service. The method further includes one or more processors determining whether the computing device maintains connection to the NAN. In response to determining that the computing device does not maintain a connection to the NAN, the method further includes one or more processors cancelling the detected request for the service.

17 Claims, 3 Drawing Sheets

US 10,833,731 B1

MANAGING RESOURCE OR SERVICE UTILIZATION WITHIN A LOCATION

BACKGROUND OF THE INVENTION

The present invention relates generally to the field of managing access to resources, and more particularly to managing utilization of resources or services based on a location of a device.

Near-field communication (NFC) is a set of communication protocols that enable two electronic devices (e.g., a smartphone and a reader device) to establish communication by bringing the devices within a close distance (e.g., 4 cm) of each other. NFC utilizes electromagnetic induction between two loop antennas located within each other's near field, effectively forming an air-core transformer. NFC devices can be used in contactless payment systems (e.g., credit cards and electronic ticket smart cards) and allow mobile payment to replace or supplement the systems. NFC can also be used for social networking, for sharing contacts, photos, videos or files.

NFC-enabled devices can act as electronic identity documents and keycards. NFC offers a low-speed connection with simple setup that can be used to bootstrap more capable wireless connections. NFC tags are passive data stores (e.g., payment card information, loyalty program data, identification information, contacts, etc.) which can be read, and under some circumstances written to, by an NFC device. NFC tags typically contain data and are read-only in normal use but may be rewritable.

A near-me area network (NAN) is a communication network that focuses on wireless communication among devices in close proximity. Unlike local area networks (LANs), where the devices are in the same network segment and share the same broadcast domain, the devices in a NAN can belong to different proprietary network infrastructures (for example, different mobile carriers). NAN applications focus on two-way communications among devices that are within a certain proximity to each other.

SUMMARY

Aspects of the present invention disclose a method, computer program product, and system for managing access to a resource or service based on a location of a device. The method includes one or more processors detecting a request from a computing device for a service. The method further includes one or more processors establishing a request from a computing device for a service. The method further includes one or more processors determining whether the computing device maintains connection to the NAN. In response to determining that the computing device does not maintain a connection to the NAN, the method further includes one or more processors cancelling the detected request for the service.

In another embodiment detecting the request from the computing device for the service, the method further includes one or more processors determining that the computing device establishes a near-field communication (NFC) connection to an NFC reader associated with the service. In a further embodiment, determining whether the computing device maintains connection to the NAN further includes one or more processors determining whether the computing device is connected to the NAN at a time that the service is available.

DETAILED DESCRIPTION

Figure 1:
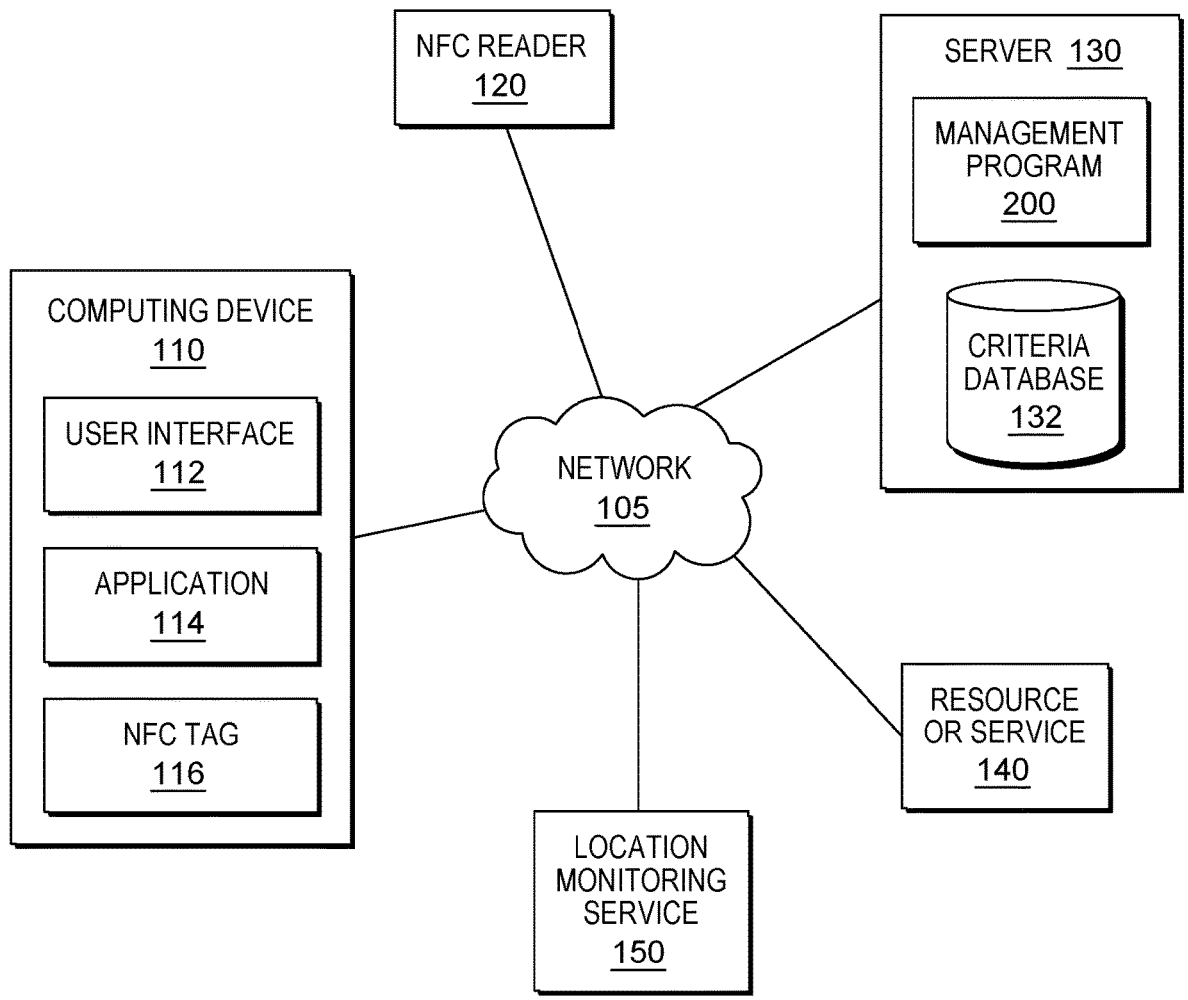
FIG. 1 is a functional block diagram of a data processing environment, in accordance with an embodiment of the present invention.

Embodiments of the present invention allow for managing access to a resource or service based on a location of a device (e.g., device presence within an area that corresponds to a resource). Embodiments of the present invention detect a request for a resource or service from a computing device and identify parameters of the request. Further, embodiments of the present invention establish a connection with the computing device (e.g., over a near-me area network (NAN)) and monitor the location of the computing device while waiting for the requested service or resource to be available.

In response to the resource or service becoming available, embodiments of the present invention determine whether the requesting computing device is within a defined location (e.g., a defined proximity distance to the resource). In response to determining that the computing is no longer within the defined location, embodiments of the present invention proceed without satisfying the request. Alternatively, in response to determining that the computing is still within the defined location, embodiments of the present invention satisfy the request.

In an example scenario, a user requests use of a transportation service at a specified area (e.g., a ride-share pick up location) utilizing near-field communication (NFC) capabilities of a computing device. Embodiments of the present invention can utilize a NAN to monitor the location of the user, via the computing device, to determine if the user is within the specified area when the transportation service is available. In response to determining that the user is not within the specified area when the transportation service is available, embodiments of the present invention can identify an alternate user (e.g., a subsequent user in the transportation service queue) and/or proceed without satisfying the satisfying the request of the user.

Some embodiments of the present invention recognize that in many scenarios, users request to utilize a location-specific resource or service but are then not present when the resource of service is available for the user to utilize. Additional embodiments of the present invention also recognize that users can make a modification to a service request prior to the fulfillment of the initial request. For example, a user boards an elevator on floor one and requests to go to floor thirty, but the user then decides to exit the elevator on floor twelve. In this example, the elevator would then travel to floor thirty, even though the requesting user is no longer present on the elevator. Additional embodiments of the present invention also recognize that users can make a modification to a service request prior to the fulfillment of the initial request. In another example, the user has previously requested to travel to floor thirty, but then decides to travel to floor forty, thus requiring the elevator to stop at floor thirty even though no passengers will exit at floor thirty. Embodiments of the present invention recognize that such scenarios lead to waste and sub-optimal utilization of resources. Various embodiments of the present invention provide solution to reduce such unnecessary waste utilizing a system that leverages NFC technology and communications over a NAN.

Embodiments of the present invention recognize that some current implementations of tracking device location within an area utilizes beacon technology, which can require triangulation to determine whether a computing device is within a defined location. Embodiments of the present invention can provide the advantage of an improved system for determining the presence of a user for an ordered task, such that the user can consume the service, and provide the system can optimize use of the service if the user is not present in a defined location/area when the service is available. Additional embodiments of the present invention can facilitate the improved system utilizing wearable devices that include NFC tags and technology (e.g., in an embodiment for security in data centers). Further, embodiments of the present invention leverage NFC technology to establish an authorized connection to a NAN to provide non-intrusive location awareness of the connected computing device.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes computing device 110, NFC reader 120, server 130, resource or service 140, and location monitoring service 150, all interconnected over network 105. In an example embodiment, an individual utilizing computing device 110 requests use of resource or service 140, utilizing NFC reader 120. In this example embodiment, server 130 manages the request, via network 105 and location monitoring servicer 150 (e.g., leveraging capabilities of a NAN).

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between includes computing device 110, NFC reader 120, server 130, resource or service 140, and location monitoring service 150, in accordance with embodiments of the present invention.

In various embodiments of the present invention, network 105 includes NAN and NFC communication capabilities (i.e., network 105 includes underlying communication protocols, which include a NAN and NFC capabilities). For example, network 105 includes a NAN for a defined location, such as a location that is associated with (e.g., encompasses) resource or service 140. In an example embodiment, the NAN capabilities are restricted to one or more specific coverage areas (i.e., one or more shaped NANs that specifically set up the coverage area). In one scenario, network 105 includes one shaped NAN for an elevator and other respective shaped NANs for elevator waiting areas on respective floors (e.g., shaped NANs bounded by wireless clouds). In additional aspects of the present invention, network 105 includes communication protocols that facilitate location tracking (e.g., by server 130 utilizing NFC reader 120 and location monitoring service 150) of computing device 110.

In various embodiments of the present invention, computing device 110 may be a workstation, personal computer, personal digital assistant, mobile phone, or any other device capable of executing computer readable program instructions, in accordance with embodiments of the present invention. In general, computing device 110 is representative of any electronic device or combination of electronic devices capable of executing computer readable program instructions. Computing device 110 may include components as depicted and described in further detail with respect to FIG. 3, in accordance with embodiments of the present invention. In an example embodiment, computing device 110 is a smart device (e.g., smartphone, smart watch, etc.) that include NFC capabilities. In another example embodiment, computing device 110 is a radio-frequency identification (RFID) card or an NFC card (e.g., a keycard, smart card, etc.).

Computing device 110 includes user interface 112, application 114, and NFC tag 116. User interface 112 is a program that provides an interface between a user of computing device 110 and a plurality of applications that reside on the computing device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on computing device 110. In an example embodiment, application 114 is a client-side application of an instance of resource or service 140 (e.g., an application that is specific to a particular resource or service). In another example embodiment, application 114 is a web browser that an individual utilizing computing device 110 utilizes (e.g., via user interface 112) to access information over network 105, such as resource or service 140. In other aspects of the present invention, application 114 can be representative of applications that provide additional functionality (e.g., camera, messaging, etc.), in accordance with various aspects of the present invention. In another embodiment, application 114 operates in conjunction with NFC tag 116 (e.g., when requesting a resource utilizing NFC reader 120).

NFC tag 116 is representative of the NFC capabilities of computing device 110 and associated information that computing device 110 can provide over NFC protocols (e.g., in a request for a resource or service). In another embodiment, NFC tag 116 is representative of an NFC tag of a keycard or other device that a user can utilize in accordance with embodiments of the present invention. In one embodiment, a user of computing device 110 defines information that is associated with NFC tag 116, such as user identification information, device identification information, information associated with a request for a resource, etc. In the depicted embodiment, computing device 110 can communicate with NFC reader 120 utilizing NFC tag 116 to send and receive information, such as requests and corresponding data, in accordance with various embodiments of the present invention.

In an example scenario, an individual utilizing computing device 110 submits a request for a transportation service at a particular location by establishing a NFC connection between computing device 110, utilizing NFC tag 116, and NFC reader 120. In this scenario, computing device 110 can also provide additional information (e.g., parameters of the transportation request) and/or authorization of device location monitoring, via NFC tag 116 and/or over network 105.

In additional embodiments, the user of computing device 110 specifies which data that computing device 110 can transmit via NFC tag 116 to utilize in accordance with embodiments of the present invention. In one scenario, the user authorizes computing device 110 to provide user identification information utilizing NFC tag 116, utilize NFC tag 116 to establish a connection with server 130 (e.g., over a NAN), and approve location monitoring of computing device within a particular location (i.e., users that have opted-in to providing data and data collection). In another scenario, the user can specify that computing device 110 will provide a certain subset of user identification information to a specific instance of resource or service 140 (e.g., the user opts-out of providing some types of data). In an example embodiment, a user of computing device 110 registers with instances of resource or service 140.

NFC reader 120 is representative of a computing device, or a component of a computing device or system, which is capable of reading information stored on, or in associated with, an NFG tag. For example, NFC reader 120 is associated with server 130 and is located within a physical area that corresponds to a location of an instance of resource or service 140 (e.g., a pick-up location of a transportation service, a registration area of a resource with a queue, etc.). In this example, an individual utilizing computing device 110 places computing device 110 in close proximity to NFC reader 120, establishing a connection between NFC reader 120 and computing device 110 utilizing NFC tag 116, which allows server 130 to receive information associated with computing device 110.

Various embodiments of the present invention can utilize a plurality of instances of NFC reader 120 in lieu of specific keypads or other electro-mechanical input devices, which an individual can utilize (i.e., by placing computing device 110 in proximity to NFC reader 120 and providing a selection of a choice from a corresponding set of choices). In further embodiments, data processing environment 100 can includes a plurality of instances of NFC reader 120, and each instance of NFC reader 120 can corresponds to a choice that a user can make (i.e., by establishing a NFC connection with computing device 110 and the corresponding instance of NFC reader 120).

In example embodiments, server 130 can be a desktop computer, a computer server, or any other computer systems, known in the art. In certain embodiments, server 130 represents computer systems utilizing clustered computers and components (e.g., database server computers, application server computers, etc.) that act as a single pool of seamless resources when accessed by elements of data processing environment 100 (e.g., computing device 110, NFC reader 120, resource or service 140, and location monitoring service). In general, server 130 is representative of any electronic device or combination of electronic devices capable of executing computer readable program instructions. Server 130 may include components as depicted and described in further detail with respect to FIG. 3, in accordance with embodiments of the present invention.

Server 130 includes criteria database 132 and management program 200. In one embodiment, server 130 is associated with a particular location, such as a physical area that corresponds to NFC reader 120 and a location of an instance of resource or service 140. In another embodiment, server 130 is a server computing system that is responsible for managing multiple instances of resource or service 140. Management program 200 can manage access to a resource or service based on a location of a device, in accordance with embodiments of the present invention. In one embodiment, management program 200 manages access of an individual utilizing computing device 110 that is requesting use of an instance of resource or service 140 based on the presence of computing device 110 within an area that corresponds to the instance of resource or service 140. Management program 200 can leverage user preference data (e.g., from computing device 110) to determine and/or receive user authorization to perform various processes, such as location monitoring of computing device 110, etc.

Criteria database 132 can be implemented with any type of storage device, for example, persistent storage 305, which is capable of storing data that may be accessed and utilized by server 130, NFC reader 120, computing device 110, resource or service 140, and location monitoring service 150, such as a database server, a hard disk drive, or a flash memory. In other embodiments, criteria database 132 can represent multiple storage devices and collections of data within server 130. In various embodiments, criteria database 132 includes information that management program 200 utilizes to manage access to a resource or service based on a location of a device, such as computing device 110 requesting use of an instance of resource or service 140.

In example embodiments, criteria database 132 includes information defined by instances of resource or service 140, such as location criteria, time criteria, user profile types, etc. In an example scenario, resource or service 140 is representative of a transportation service, which defines criteria requirements of a defined area at a pick-up location (i.e., a location criteria) and a time criteria of five minutes prior to an arrival of a transportation service, which is stored in criteria database 132 associated with resource or service 140. In another scenario, criteria database 132 can include an indication of a particular NAN that corresponds to an instance of resource or service 140. In various embodiments, criteria database 132 includes information and data that is authorized by resource or service 14o and computing device 110 (i.e., users, resources, and services opt-in to data collection and can define which data is monitored and collected).

Resource or service 140 can be representative of any resource or service that can operate in associated with management program 200, in accordance with embodiments of the present invention. For example, resource or service 140 can be representative of one or more of: a transportation service (e.g., ride-share service, elevator, public transportation, etc.), ordering food (e.g., in a quick service restaurant (QSR), etc.), user authentication at a resource, (e.g., a user logged into a public or secure computer), monitoring within a defined location, other services with an associated queue, etc. In various embodiments, resource or service 140 utilizes functionality of server 130 (e.g., management program 200) to manage access based on location information of a user (e.g., computing device 110).

Location monitoring service 150 can be representative of capabilities, accessible over network 105, that server 130 can utilize to monitor a location associated with an instance of resource or service 140, in accordance with embodiments of the present invention. In one example scenario, location monitoring service 150 can determine the location of a user (e.g., via computing device 110) with respect to resource or service 140, in accordance with embodiments of the present invention. In another scenario, location monitoring service 150 determines whether a requested instance of resource or service 140 is available at a corresponding location (e.g., a transportation service has arrived or is arriving shortly, a requested resource is available for user, a service is ready, etc.). In example embodiments, location monitoring service 150 can be representative of one or more sensors that server 130 (and management program 200) can utilize and/or a third-party service that provides information to server 130 (e.g., a Global Positioning System (GPS), a geographic information system (GIS), etc.).

In another embodiment, location monitoring service 150 corresponds to a NAN, which server 130 (and management program 200) can utilize to monitor the location of computing device 110. For example, management program 200 can determine whether computing device 110 is connected to a NAN that corresponds to a defined area surrounding resource or service 140. In one scenario, location monitoring service 150 is associated with a NAN of an elevator (i.e., resource or service 140), where the NAN of the elevator encompasses the elevator and a defined perimeter that encompasses entrances to the elevator. In another scenario, location monitoring service 150 is associated with a NAN that encompasses a waiting area of an instance of resource or service 140 that has a queue of waiting users.

Figure 2:
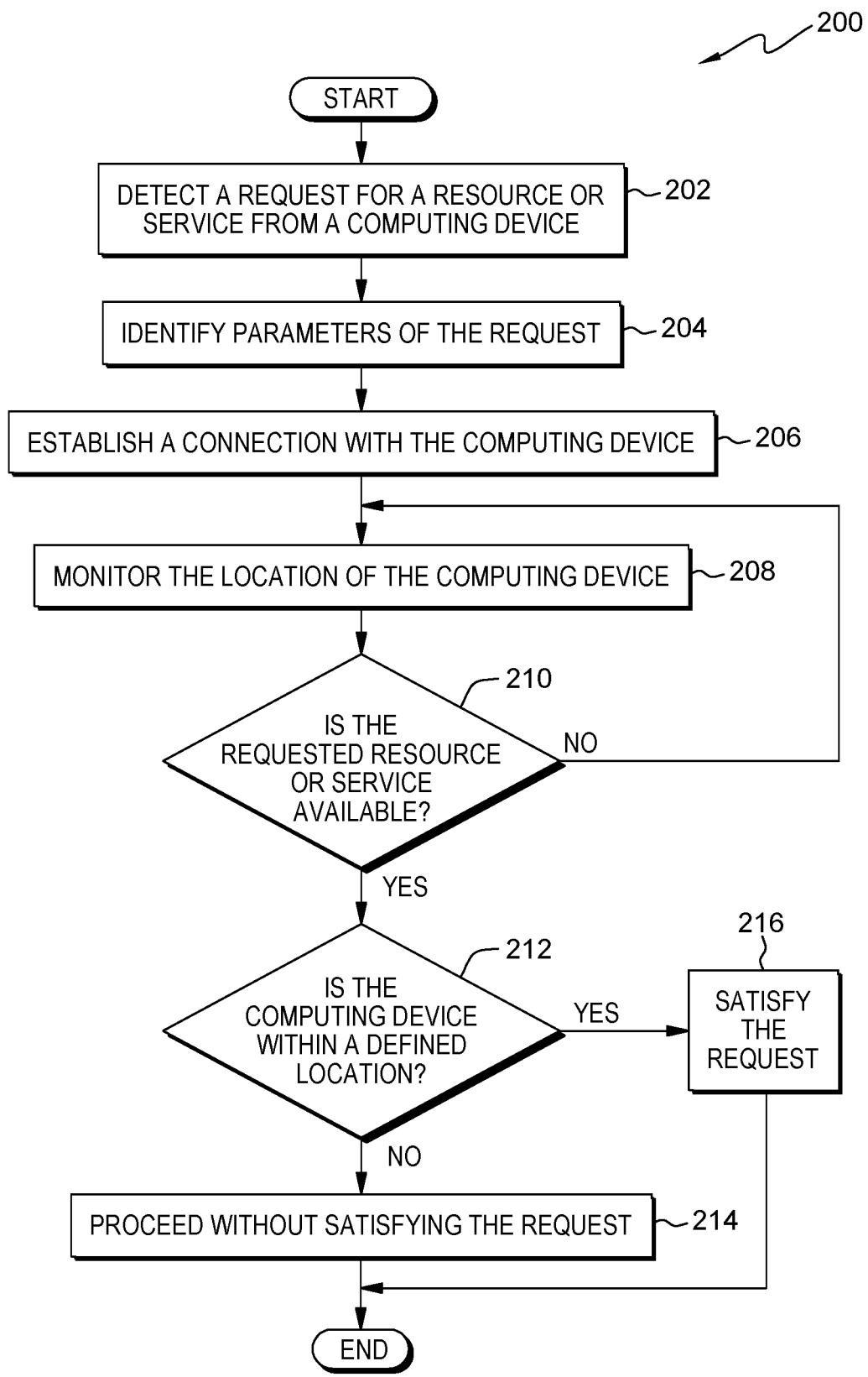
FIG. 2 is a flowchart depicting operational steps of a program for managing access to a resource or service based on a location of a device, in accordance with an embodiment of the present invention.

FIG. 2 is a flowchart depicting operational steps of management program 200, a program for managing access to a resource or service based on a location of a device, in accordance with embodiments of the present invention.

In one embodiment, management program 200 monitors for requests of one or more instances of resource or service 140. For example, management program 200 monitors NFC reader 120 for requests for an instance of resource or servicer 140 that has a corresponding queue of users (e.g., waits for a user to request a service). In another embodiment, management program 200 monitors NFC reader 120 for a request from a registered user (i.e., a user that has opt-ed in). In an example embodiment, management program 200 initiates in response to detecting an NFC communication/exchange between computing device 110 and NFC reader 120 (e.g., an NFC reader from a plurality of NFC readers that indicate a choice for the user).

In step 202, management program 200 detects a request for a resource or service from a computing device. In one embodiment, management program 200 detects an NFC communication/exchange between computing device 110 (e.g., via NFC tag 116) and NFC reader 120. Management program 200 can monitor NFC reader 120 for NFC exchanges. In various embodiments, management program 200 detects NFC exchanges that include information indicating a request for an instance of resource or service 140. In additional embodiments, management program 200 detects NFC exchanges that include information indicating a modification or change to an existing request for an instance of resource or service 140.

In an example scenario, an individual utilizing computing device 110 (e.g., a smartphone or keycard) is requesting use of an elevator (i.e., an instance of resource or service 140) and places computing device 110 in close proximity to NFC reader 120 (e.g., a reader near the entrance of the elevator), allowing NFC reader 120 to communicate with NFC tag 116. In this example scenario, management program 200, based on data included in the NFC exchange, detects that the individual utilizing computing device 110 is requesting to utilize the elevator.

In step 204, management program 200 identifies parameters of the request. In one embodiment, management program 200 identifies parameters of the detected request from computing device 110 (from step 202) to utilize an instance of resource or service 140. In an example embodiment, computing device 110 provides information, in an NFC exchange during the request, which defines the parameters of the request for the instance of resource or service 140 (e.g., default parameters, user-input parameters, etc.). In another embodiment, resource or service 140 can define parameters that correspond to use of the requested instance of resource or service 140 (e.g., within criteria database 132).

In various scenarios, the parameters can include, but are not limited to a food order at a QSR, elevator request and indication of destination, ride-share request and indication of destination, user preference information, user-indicated timing requirements associated with a request, location information, user approval/permissions information, NAN access approval, or information associated with another task that has an associated wait queue. In another embodiment, management program 200 can analyze and parse the detected request from computing device 110 and determine a location that corresponds to the requested instance of resource or service 140.

In an example scenario, management program 200 detects the request for the elevator (in step 202) and identifies parameters that include the elevator location, a time of the request, a requested floor, a location of the user, and user-defined authorizations and permissions (e.g., the user authorizing access to the NAN associated with the elevator). In another aspect of the example scenario, management program 200 identifies parameters that correspond to the use of the elevator, defined in criteria database 132, such as an indication of the NAN that is associated with the elevator, a defined area that corresponds to use of the elevator (e.g., as defined by the NAN).

In another example scenario, management program 200 detects a request for a transportation service (e.g., a ride-share service) and identifies parameters of the request that include user-authorized identification information, a time the request was made, a requested time for the transportation service, a location of computing device 110 at the time of the request, and user-defined authorizations and permissions (e.g., the user authorizing access to the NAN associated with the elevator). In another aspect of this example scenario, management program 200 identifies parameters that correspond to the use of the requested transportation service, defined in criteria database 132, such as an indication of the NAN that is associated with the transportation service, a defined area that corresponds to a waiting area for the transportation service (e.g., as defined by the NAN), timing requirements of the transportation service (e.g., the user needs to be within the defined waiting area 5 minutes prior to arrival of the transportations service).

In step 206, management program 200 establishes a connection with the computing device. In one embodiment, management program 200 establishes a connection between computing device 110 and a NAN associated with the requested instance of resource or service 140. Management program 200 can utilize the identified parameters of the request (from step 204) to determine that an individual utilizing computing device 110 authorizes connection to the NAN. In an example embodiment, management program 200 utilizes the NFC exchange between NFC reader 120 and NFC tag 116 of computing device 110 to authorize and bootstrap a connection of computing device 110 to the NAN that corresponds to the requested instance of resource or service 140.

In one example scenario, management program 200 connects computing device 110 to the NAN that is associated with the requested elevator. In another example scenario, management program 200 connects computing device to the NAN that corresponds to the requested transportation service. In other scenarios, management program 200 can establish a connection between computing device 110 and other forms of wireless network communications (e.g., over network 105) that are associated with a particular location, in accordance with embodiments of the present invention.

In step 208, management program 200 monitors the location of the computing device. In one embodiment, management program 200 monitors the location of computing device 110 (i.e., the computing device that provided the detected request of step 202) based on whether computing device 110 maintains a connection to the NAN (connected in step 206). In another embodiment, management program 200 can utilize capabilities of location monitoring service 150 to monitor the location of computing device 110, relative to the requested instance of resource or service 140. Management program 200 can utilize the NAN connection to monitor the location of computing devices that correspond to users that have provided authorization for location monitoring (e.g., as a user preference, in a request for a resource or service, etc.).

In various embodiments, management program 200 monitors the NAN for indications that computing device is still connected to the NAN; and therefore, computing device is within the defined proximity to resource or service 140, as defined in criteria database 132. In another aspect, in response to determining that computing device 110 is no longer connected to the NAN (i.e., is out of range), management program 200 can terminate or go on hold for a period of time (e.g., until computing device 110 returns or for a defined amount of time in criteria database 132).

Embodiments of the present invention provide the advantage of monitoring the location of computing device 110 within a location associated with an instance of resource or service 140 utilizing the established NAN connection, which reduces the amount of resource requirements (e.g., sensors, GPS tracking, cameras, smartphone data and interaction, etc.) through the NAN connectivity determination.

In decision step 210, management program 200 determines whether the requested resource or service is available. In one embodiment, management program 200 determines whether server 130 receives an indication that the requested (from step 202) instance of resource or service 140 is available. For example, resource or service 140 provides an indication that the request is ready to be fulfilled. In another example, management program 200 receives an alert from location monitoring service 150 that the requested instance of resource or service 150 is available at a corresponding location.

In response to determining that the requested resource or service is not yet available (decision step 210, NO branch), management program 200 continues to monitor the location of the computing device (step 208). In example embodiments, management program 200 performs step 208 and decision step 210 concurrently, to monitor the location of computing device 110 (e.g., utilizing the NAN) until the requested (from step 202) instance of resource or service 140 is available.

In an example scenario, management program 200 monitors the location of computing device 110 based on whether computing device 110 maintains a connection to the NAN associated with the requested elevator. Management program 200 can also determine whether the elevator has arrived, or is arriving, at the requested floor (i.e., to pick up the requesting user). In another example scenario, management program 200 determines whether a transportation service has arrived at a corresponding pick-up location (e.g., utilizing location monitoring service 150). In this example scenario, management program 200 can determine that the transportation service has not yet arrived at, or within a defined proximity (from criteria database 132), to the corresponding pick-up location. Accordingly, management program 200 can loop to step 208 to continue to monitor the location of computing device 110 (e.g., whether computing device 110 is still connected to the NAN that corresponds to the transportation pick-up location).

In step 212, management program 200 determines whether the computing device is within a defined location. More specifically, in response to determining that the requested resource or service is available (decision step 210, YES branch), management program 200 determines whether the requesting computing device is within a defined location. In one embodiment, management program 200 determines whether computing device 110 is still connected to the NAN associated with the requested instance of resource or service 140. In an example, embodiment, management program 200 utilizes monitoring information from step 208 to determine whether computing device 110 has maintained connection to the NAN associated with the requested instance of resource or service 140.

In another embodiment, management program 200 determines whether computing device 110 is currently connected to the NAN associated with an instance of resource or service 140. For example, computing device 110 has previously disconnected, but then re-establishes a connection with the corresponding NAN prior to management program 200 determining that the resource is available. In additional embodiments, management program 200 can perform the processes of decision step 210 and decision step 212 concurrently, or in an alternate order.

In various embodiments, management program 200 utilizes information from criteria database 132 to identify the specifications of the defined location (e.g., as defined by the corresponding instance of resource or service 140). In an example, the connectivity area of the NAN associated with an instance of resource or service 140 represents the defined area (i.e., if computing device 110 is connected to the NAN, then computing device 110 is within the defined area). In other examples, criteria database 132 can include additional parameters to specify the defined area associated with an instance of resource or service 140, which management program 200 can access and utilize.

In step 214, management program 200 proceeds without satisfying the request. More specifically, in response to determining that the computing device is not within the defined location (decision step 212, NO branch), management program 200 proceeds without satisfying the request (step 214). For example, management program 200 cancels the detected request (of step 202). In one embodiment, responsive to determining that computing device 110 is not connected to the NAN associated with the requested instance of resource or service 140, management program 200 does not satisfy the request (of steps 202 and 204). In various embodiments, management program 200 can proceed without satisfying the request by proceeding to end, and/or identifying a next user in a queue that has requested use of the instance of resource or service 140.

In an example scenario, an individual utilizing computing device 110 requested use of an elevator (in step 202) and requests to go from floor one to floor thirty (parameters of step 204). In this example, the user decides to exit the elevator at floor twenty. Management program 200, prior to arrival at floor thirty, determines that computing device 110 (i.e., the computing device associated with the user, such as a smart watch or smart keycard) is no longer connected to the NAN of the elevator. Accordingly, management program 200 determines that the user, and computing device 110, is no longer within the defined location (i.e., connected to the NAN of the elevator) (decision step 212, NO branch) and allows the elevator to proceed without stopping at floor thirty.

In another example scenario, in response to determining that a vehicle of a transportation service is approaching a pick-up location (decision step 210, YES branch) and that computing device is not within the defined area of the pick-up location (decision step 212, NO branch), management program 200 proceeds without satisfying the request (from step 202 and 204) of the user of computing device 110. In this example scenario, management program 200 can identify a next user in a queue of users that have requested use of the transportation service.

In another embodiment, management program 200 can determine that a user re-enters an area corresponding to a requested instance of resource or service 140, by determining that computing device 110 re-establishes connection with the corresponding NAN. In this embodiment, management program 200 can add the user to the queue (e.g., to a position based on preferences of criteria database 132) for the requested instance of resource or service 140 (e.g., that the user previously requested in step 202 and 204).

In step 216, management program 200 satisfies the request. More specifically, in response to determining that the computing device is within the defined location (decision step 212, YES branch), management program 200 satisfies the request (from step 202 and 204). In one embodiment, management program 200 facilitates completion of the request detected in step 202 based on the parameters identified in step 204 (i.e., facilitates execution of the time-based ordered task).

In an example scenario, management program 200 determines that computing device 110 is connected to the NAN of the elevator (decision step 212, YES branch) and directs the elevator to continue to proceed to the requested floor. In another example scenario, management program 200 determines that computing device 110 is within a pick-up location for the transportation service (e.g., based on the NAN connection) (decision step 212, YES branch) and transmits a notification to computing device 110 that the requested vehicle is approaching the pick-up location.

Figure 3:
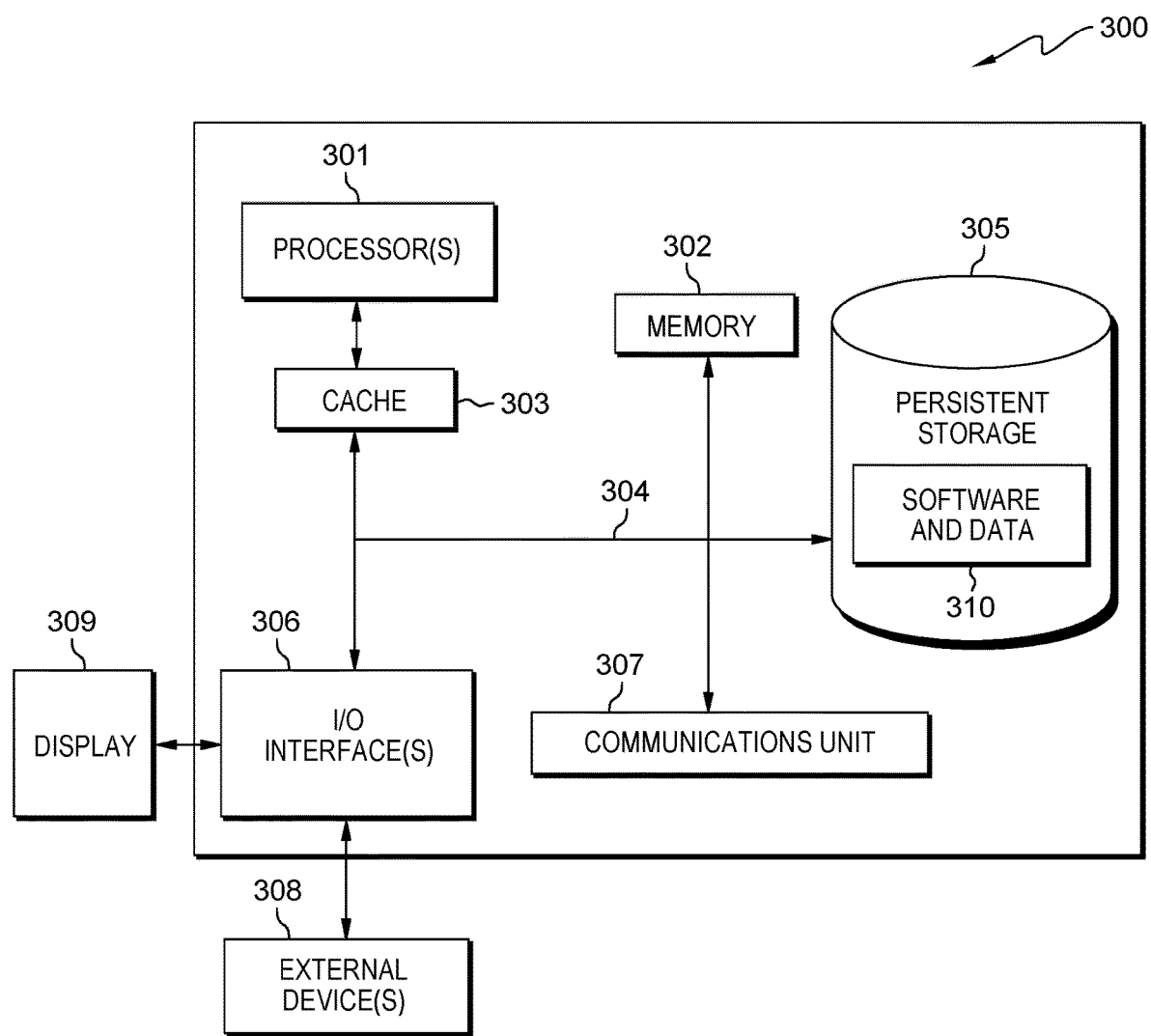
FIG. 3 depicts a block diagram of components of a computing system representative of the computing device, near-field communication (NFC) reader, and server of FIG. 1, in accordance with an embodiment of the present invention.

FIG. 3 depicts computer system 300, which is representative of computing device 110, NFC reader 120, and server 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to computing device 110, software and data 310 can be representative of user interface 112, application 114, NFC tag 116, and data stored in association with NFC tag 116 (not shown). With respect to server 130, software and data 310 includes management program 200 and criteria database 132.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    a server computer detecting a near-field communication (NFC) exchange between a computing device and an NFC reader, wherein the NFC exchange includes parameters of a request for a service that is associated with the NFC reader;
    in response to the NFC exchange of the parameters of the request for the service between the computing device and the NFC reader, the server computer establishing a connection between the computing device and a near-me area network (NAN) that encompasses an area that corresponds to the service, wherein establishing the connection between the computing device and the NAN that encompasses an area that corresponds to the service further comprises:
        in response to determining that the parameters of the request include a user authorization to establish the connection between the computing device and the NAN, the server computer bootstrapping the connection of the computing device to the NAN;
    the server computer determining whether the computing device maintains connection to the NAN; and
    in response to determining that the computing device does not maintain a connection to the NAN, the server computer cancelling the request for the service.

2. The method of claim 1, wherein the server computer determining whether the computing device maintains connection to the NAN, further comprises:
    the server computer determining whether the computing device is connected to the NAN at a time that the service is available.

3. The method of claim 1, further comprising:
    in response to determining that the computing device does not maintain a connection to the NAN, the server computer completing the service.

4. The method of claim 1, further comprising:
    in response to cancelling the detected request for the service, the server computer identifying a next user in a queue corresponding to the service.

5. The method of claim 1, wherein the service is selected from the group consisting of: a transportation service, access to a resource, performing a task, a food service, and a resource with an associated waiting queue.

6. The method of claim 1, further comprising:
    in response to detecting a change to the detected request, the server computer replacing the detected request with the detected change to the detected request.

7. The method of claim 1, further comprising:
    the server computer parsing the NFC exchange to identify the parameters of the request for the service, wherein the parameters are selected from the group consisting of: location information, a requested destination, authorization to connect to the NAN, and timing information.

8. The method of claim 1, wherein the request for the service the service is a transportation request for a ride-sharing service.

9. A computer program product comprising:
    one or more computer readable storage media and program instructions stored on the one or more computer readable storage media, the program instructions executable by a server computer, the program instructions comprising:
    program instructions to detect a near-field communication (NFC) exchange between a computing device and an NFC reader, wherein the NFC exchange includes parameters of a request for a service that is associated with the NFC reader;
    in response to the NFC exchange of the parameters of the request for the service between the computing device and the NFC reader, program instructions to establish a connection between the computing device and a near-me area network (NAN) that encompasses an area that corresponds to the service, wherein the program instructions to establish the connection between the computing device and the NAN that encompasses the area that corresponds to the service further comprise program instructions to:
        in response to determining that the parameters of the request include a user authorization to establish the connection between the computing device and the NAN, bootstrap the connection of the computing device to the NAN;
    program instructions to determine whether the computing device maintains connection to the NAN; and
    in response to determining that the computing device does not maintain a connection to the NAN, program instructions to cancel the request for the service.

10. The computer program product of claim 9, wherein the program instructions to determine whether the computing device maintains connection to the NAN further comprise program instructions to:
    determine whether the computing device is connected to the NAN at a time that the service is available.

11. The computer program product of claim 9, further comprising program instructions, stored on the one or more computer readable storage media, to:
    in response to cancelling the detected request for the service, identify a next user in a queue corresponding to the service.

12. The computer program product of claim 9, wherein the service is selected from the group consisting of: a transportation service, access to a resource, performing a task, a food service, and a resource with an associated waiting queue.

13. A computer system comprising:
    one or more computer processors of a server computer;

one or more computer readable storage media; and program instructions stored on the computer readable storage media for execution by at least one of the one or more processors of the server computer, the program instructions comprising:

program instructions to detect a near-field communication (NFC) exchange between a computing device and an NFC reader, wherein the NFC exchange includes parameters of a request for a service that is associated with the NFC reader;

in response to the NFC exchange of the parameters of the request for the service between the computing device and the NFC reader, program instructions to establish a connection between the computing device and a near-me area network (NAN) that encompasses an area that corresponds to the service, wherein the program instructions to establish the connection between the computing device and the NAN that encompasses the area that corresponds to the service further comprise program instructions to:

in response to determining that the parameters of the request include a user authorization to establish the connection between the computing device and the NAN, bootstrap the connection of the computing device to the NAN;

program instructions to determine whether the computing device maintains connection to the NAN; and in response to determining that the computing device does not maintain a connection to the NAN, program instructions to cancel the request for the service.

14. The computer system of claim 13, wherein the program instructions to determine whether the computing device maintains connection to the NAN further comprise program instructions to:

determine whether the computing device is connected to the NAN at a time that the service is available.

15. The computer system of claim 13, further comprising program instructions, stored on the computer readable storage media for execution by at least one of the one or more processors, to:

in response to cancelling the detected request for the service, identify a next user in a queue corresponding to the service.

16. The computer system of claim 13, wherein the service is selected from the group consisting of: a transportation service, access to a resource, performing a task, a food service, and a resource with an associated waiting queue.

17. The computer system of claim 13, further comprising program instructions, stored on the computer readable storage media for execution by at least one of the one or more processors, to:

parse the NFC exchange to identify the parameters of the request for the service, wherein the parameters are selected from the group consisting of: location information, a requested destination, authorization to connect to the NAN, and timing information.

* * * * *